US006678754B1

(12) United States Patent
Soulier

(10) Patent No.: US 6,678,754 B1
(45) Date of Patent: Jan. 13, 2004

(54) METHODS AND STRUCTURE FOR RECURSIVE SCATTER/GATHER LISTS

(75) Inventor: Paul E. Soulier, Colorado Springs, CO (US)

(73) Assignee: LSI Logic Corporation, Milpitas, CA (US)

(*) Notice: Subject to any disclaimer, the term of this patent is extended or adjusted under 35 U.S.C. 154(b) by 291 days.

(21) Appl. No.: 09/918,028

(22) Filed: Jul. 30, 2001

(51) Int. Cl.[7] ............................................... G06F 13/28
(52) U.S. Cl. .............................. 710/23; 710/22; 710/3
(58) Field of Search ............................ 710/3, 22, 30, 710/50, 5, 6, 23

(56) References Cited

U.S. PATENT DOCUMENTS 5,251,303 A * 10/1993 Fogg, Jr. et al.
5,497,476 A * 3/1996 Oldfield et al.
5,708,849 A * 1/1998 Coke et al.
5,948,060 A * 9/1999 Gregg et al.

OTHER PUBLICATIONS

"Looping Scatter/Gather Bus Master to Coprocessor Data Transfer Mechanism", Sep. 1, 1990, IBM Technical Disclosure Bulletin, TDB-ACC-NO: NN9009382.*

"Linked List Basics" by Nick Parlante, http://cslibrary.stanford.edu/103/, ©1998-2001.*

* cited by examiner

Primary Examiner—Jeffrey Gaffin
Assistant Examiner—Alan Chen
(74) Attorney, Agent, or Firm—Lathrop & Gage L.C.

(57) ABSTRACT

Methods of operation and systems for a standardized scatter/gather list processor component within DMACs and intelligent IOPs. The standardized circuit architecture and methods provide a register interface and associated processing capabilities to simplify firmware processing to save and restore context information regarding block transfer operations that are paused and resumed prior to completion. Furthermore, the invention provides for architecture and associated methods for processing of standard scatter/gather list elements by a standardized scatter/gather list processor embedded within DMACs and IOPs. Specifically, as applied in the context of SCSI or Fibre Channel IOPs, the scatter/gather list processor of the present invention simplifies IOP firmware processing to save the current block transfer context on occurrence of a SCSI disconnect and to restore the saved context on occurrence of a SCSI reselect.

10 Claims, 2 Drawing Sheets

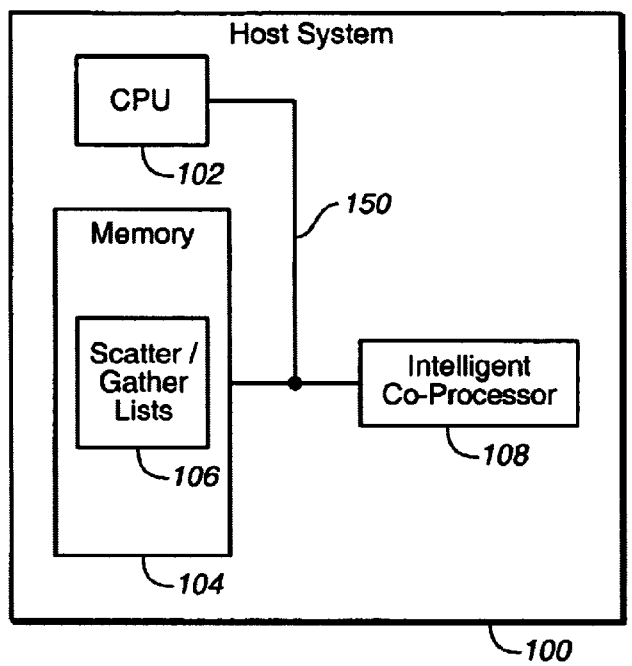
FIG._1
*(PRIOR ART)*
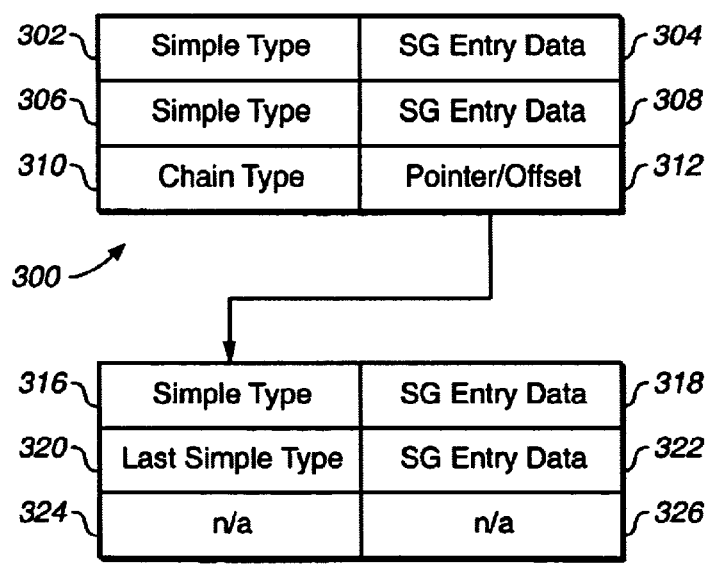
FIG._3

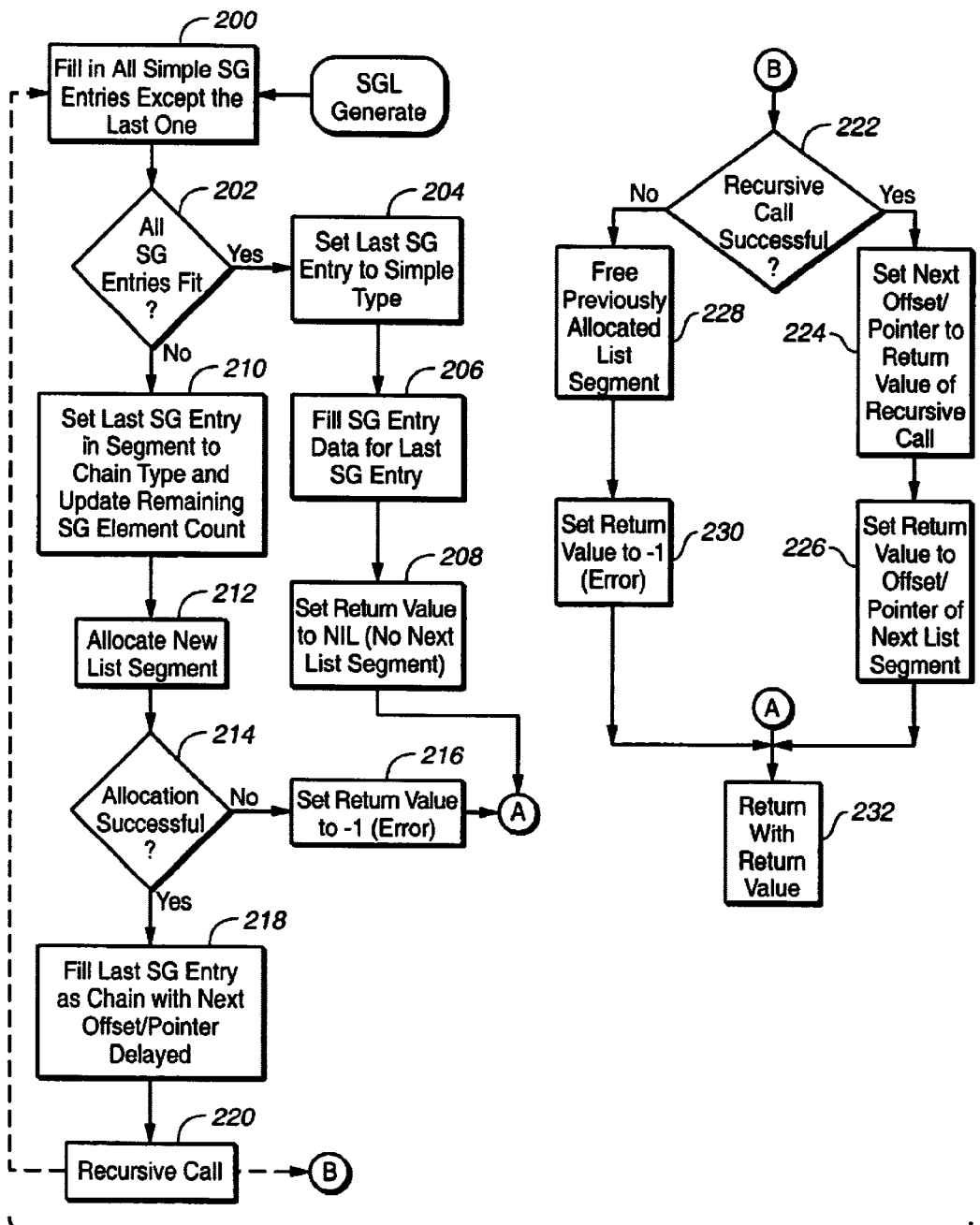
FIG._2

METHODS AND STRUCTURE FOR RECURSIVE SCATTER/GATHER LISTS

BACKGROUND OF THE INVENTION

1. Field of the Invention

The present invention relates to computing coprocessor architectures and more specifically relates to methods and structures for generating scatter/gather lists recursively.

2. Discussion of Related Art

It is common in computing and electronic applications for a processor device to manipulate large blocks of memory for particular application purposes. For example, direct memory access controllers ("DMAC") are often used in conjunction with general-purpose processors ("CPU") to handle movement of large blocks of data with minimal overhead processing by the general-purpose CPU. The DMAC is programmed by the CPU to indicate the block of memory to be manipulated including, for example, a source location, destination location, and count of the number of units of memory to be moved. The DMA controller then performs the requested block memory move operation without further intervention by the CPU. This generally frees the CPU computational power for processing of other operations for the particular application. When the DMA controller completes the block memory operation, it notifies the CPU o,f the completion and the CPU then continues processing as necessary following completion of the block memory operation.

It is also common for intelligent I/O processor ("IOP") devices to include similar block memory manipulation structures. For example, a SCSI bus controller or Fibre Channel controller may include programmable capabilities such that it directly manipulates blocks of memory to transfer information between the SCSI bus (or Fibre Channel medium) and the system memory of a host computer. Similar to the purpose of a DMAC, IOP serve to offload the general-purpose CPU from the lower-level responsibilities of manipulating individual units of memory in the block memory operations. Rather, the DMAC or IOP is programmed to perform the particular block operation and interrupt or otherwise notify the general-purpose CPU when the block operation is completed.

It is common in the present day DMACs and IOPs to include a capability for processing multiple block memory operations under the programmable direction of an associated general-purpose CPU. Specifically, the general-purpose CPU may supply information to the DMAC or IOP to signify a plurality of memory blocks to be used in a plurality of block transfer operations. Frequently, a list of memory blocks to be manipulated is supplied to the DMAC or IOP by the general-purpose CPU. The list is often referred to as a scatter/gather list ("SGL"). The list may, for example, identify a plurality of blocks of memory to be "written" to one or more destination locations or may specify the "reading" of noncontiguous source locations of memory for transfer to one or more destination locations (i.e., the "scattering" or "gathering" of memory blocks).

The scatter/gather list may be specified utilizing any of a variety of well-known computing data structures to define a list of such elements for processing within the DMAC or IOP.

Software elements within a host computing system generate scatter/gather lists to provide to intelligent coprocessors for processing needed block transfer operations. For example, device driver software elements with an operating system frequently construct scatter/gather lists to provide to intelligent co-processors such as DMA controllers and/or I/O processors.

Because such construction of scatter/gather lists is a common function within device drivers, it is imperative that the function be as efficient as possible to maintain high performance levels in the computing system.

Presently practiced techniques utilize well-known looping software constructs to generate the scatter/gather list elements. Each iteration of the looping construct allocates memory for one or more scatter/gather elements to be added to the list. Various mathematical computations and comparisons are performed in each iteration of the looping construct. Such looping constructs generate certain complexities that affect computational performance of the method within, for example, a device driver. Further, if one iteration of the construction looping fails to properly allocate the scatter/gather element it is processing, memory previously allocated for earlier scatter/gather elements may need to be released. This need presents further complexities in the design of, for example, device drivers.

It is evident from the above discussion that a need exists for an improved method and structure for efficiently generating scatter/gather lists for intelligent co-processors.

SUMMARY OF THE INVENTION

The present invention solves the above and other problems, thereby advancing the state of the useful arts, by providing methods and associated structure for recursive generation of scatter/gather lists. The recursive methods of the present invention reduce computational complexity of scatter/gather list generation and simplify the allocation and release of memory allocated for the scatter/gather list in case of error in the generation process.

A first aspect of the invention provides for a method for generating scatter/gather lists comprising the steps of: providing a list segment for storing scatter/gather entries wherein the list segment has an associated size; providing a vector of descriptors used to generate scatter/gather entries; providing a number of remaining entries in the vector of descriptors; generating a number of scatter/gather entries into the list segment wherein the maximum number is determined in accordance with the size of the list segment; determining whether additional entries of the number of remaining entries need to be generated; returning successful completion status to the invoking function in response to a determination that no additional entries need be generated; performing steps to follow in response to a determination that a number of the additional entries need be generated; allocating a new list segment having a new associated size; adjusting the number of remaining entries and the vector of descriptors in accordance with the number of scatter/gather entries generated; and recursively invoking the above steps using the new list segment and using the new associated size and using the number of remaining entries as adjusted and using the vector of descriptors as adjusted.

A further aspect provides that the step of allocating includes the steps of: determining that the allocating of the new list segment failed; and returning a failure status to the invoking function in response to the determination that the allocating failed, and further provides that the step of recursively invoking includes the steps of: determining that the recursive invocation returned a failure status; deallocating the previously allocated the new list segment; and returning a failure status to the invoking function in response to the determination that the allocating failed.

Still a further aspect provides that the step of allocating includes the step of: linking the list segment to the new list segment.

These and other features, aspects and benefits of the present invention will be readily apparent to those skilled in the art through a more careful reading of the following description and associated drawings as follows.

BRIEF DESCRIPTION OF THE DRAWINGS

FIG. 1 is a block diagram of a host system, as known in the art, operable to generate scatter/gather lists.

FIG. 2 is a flowchart of an exemplary preferred embodiment of a recursive method for generating scatter/gather lists in accordance with the present invention.

FIG. 3 is a block diagram of an exemplary preferred embodiment of a scatter/gather entry format generated recursively in accordance with the present invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a typical system 100 as known in the art wherein CPU 102 of the host system 100 communicates with an intelligent co-processor 108 via bus 150. Intelligent co-processor 108 is instructed to perform block data transfer operations in accordance with information in a scatter/gather list 106 generated by CPU 102 in memory 104. Those skilled in the art will recognize that bus 150 may be any of several well-known commercial bus structures. In the preferred embodiment, bus 150 is a PCI compatible bus or other bus structure common to present day personal computers and workstations. Further, intelligent co-processor 108 may be any of several block data transfer co-processors as presently practiced in the art. For example, intelligent co-processor 108 may be a direct memory access controller ("DMAC") used for rapid exchange of information between two other devices (not shown) typically commonly attached to bus 150. Or, for example, intelligent co-processor 108 may be an intelligent I/O adapter device that couples the host system to I/O peripheral bus structures. For example, a SCSI or Fibre Channel host adapter device may process block transfer requests on behalf of host system 100 under the direction of scatter/gather lists 106 generated in memory 104 by CPU 102. Further, scatter/gather lists 106 may remain resident in memory 104 and be directly accessed by intelligent co-processor 108 or may be transferred via bus 150 from memory 104 to local storage (not shown) associated with intelligent co-processor 108.

Those skilled in the art will recognize FIG. 1 a merely exemplary of a typical host system environment in which the methods and structures of the present invention may be advantageously applied. Numerous equivalent systems architectures are known to those skilled in the art where scatter/gather lists are constructed. The methods and structures of the present invention for recursive generation of scatter/gather lists is therefore broadly applicable to many such system architectures and environments.

Scatter/gather lists may be structured according to any number of well-known data structures. In general, a scatter/gather list structure may be characterized as a linked list of list segments where each entry in each list segment provides information regarding one scatter/gather entry. Each scatter/gather entry provides information regarding one block transfer operation—i.e., address and length information for a block of data to be transferred from a source to a destination.

FIG. 3 is a block diagram of one exemplary preferred embodiment of a scatter/gather list. The scatter/gather list of FIG. 3 is comprised of a plurality of list segments (300 and 314). Each list segment is comprised of a plurality of scatter/gather entries (302–312 and 316–326, respectively). A scatter/gather entry preferably includes at least a type or flags field (302, 306, 310, 316, 320 and 324) and associated scatter/gather data field(s) (304, 308, 312, 318, 322 and 326).

In this exemplary preferred embodiment, the type of a scatter/gather entry as indicated in the type or flag field may be a simple type or a chain type. The scatter/gather entries corresponding with flag fields 302, 306, 316 and 320 are simple type entries. The corresponding scatter/gather data fields (304, 308, 318 and 322) therefore contain information describing a block data transfer operation.

The scatter/gather entry corresponding to flag field 310 is a chain type of entry. The corresponding data field 312 therefore contains a pointer to the next list segment 314 in the scatter/gather list. The last scatter/gather entry in the last list segment 314 of the scatter/gather list includes an additional indicator in its flag field 320 that it is the last entry of the last list segment in the scatter/gather list. Additional scatter/gather entries (324, 326) in the last list segment 314 are simply unused.

Those skilled in the art will readily recognize a wide variety of equivalent design choices for a scatter/gather list structure. The structure shown in FIG. 3 is merely exemplary of all such scatter/gather list structures. The common feature of all such list structures as noted above is the linked list data structure that provides the flexibility for virtually limitless size of scatter/gather lists defined virtually limitless sequences of related block transfer requests. Such scatter/gather lists and their application are well known to those of ordinary skill in the art. The structure of FIG. 3 is therefore intended as representative of one such scatter/gather list used in explaining the methods of the present invention below.

FIG. 2 is a flowchart describing the recursive technique of the present invention for generating a scatter/gather list such as that shown in FIG. 3 above. The method of FIG. 2 shows the recursive aspect of the method. This recursive aspect of the method presumes an initial call from a higher level of the host system (i.e., by a device driver or other block transfer request generation feature of the host system). The initial call supplies parameters including a first list segment allocated by the host system (i.e., by the device driver). The recursive method fills the first list segment then allocates additional segments and recursively invokes its functionality to generate as many list segments as needed for the complete scatter/gather list.

Element 200 is first operable to fill the present list segment with simple type scatter/gather entries from the information supplied by the caller. The last entry in the present list segment is left unfilled until later processing below to determine whether it is also a simple type entry or whether it is a chain type entry to link to additional list segments.

Element 202 then determines whether all scatter/gather entries can fit in the present list segment. If so, no additional list segments will be required in this scatter/gather list and processing continues at element 204. Element 204 sets the type field of the last scatter/gather entry of the present list segment to a simple type (the last simple type). Element 206 fills this last scatter/gather entry with the block transfer information supplied by the caller. Element 208 then sets the return value of the recursive function call to indicate a NIL pointer value—i.e., no next list segment is allocated. Processing (of the present level of recursion) then completes by element 232 returning the presently set return value to the calling function.

If element 202 determines that an additional list segment is required to generate remaining supplied scatter/gather entries, element 210 is operable to set the type of the last scatter/gather entry in the present list segment to a chain type. Element 212 then allocates memory for a next list segment. Element 214 determines whether the allocation attempt was successful. If not, element 216 sets the return value to indicate an error at this recursion level. Processing (of the present level of recursion) then completes by element 232 returning the presently set return value to the calling function.

If element 214 determines that the new list segment allocation was successful, element 21 8 then fills the last scatter/gather entry with information for the chain type element. In particular, the pointer to the just allocated next list segment is entered into the chain type entry pointer field. Element 220 then recursively invokes the same method (as indicated by the dashed line) and processing continues at element 200 in a next level of recursion.

Upon return from a previous level of recursion, element 222 determines whether the recursive call successfully allocated and filled a new list segment. If so, element 224 enters the returned pointer value in the chain pointer value of the last list segment as delayed in element 218. Element 226 then sets the return value of this present recursion level to the pointer value of the just allocated next list segment. Processing (of the present level of recursion) then completes by element 232 returning the presently set return value to the calling function.

If element 222 determines that a recursive call failed to properly allocate a new list segment, element 228 is operable to free the list segment used in the present recursion level. Element 230 sets the return value to indicate an error condition. Processing (of the present level of recursion) then completes by element 232 returning the presently set return value to the calling function.

Those skilled in the art will recognize inherent difficulty in describing a recursive method in a flowchart. The following pseudo-code excerpt provides further help for those skilled in the art to understand the recursive method of the present invention.

```
int buildSgl ( int              Size,
               PTR_SGE-SIMPLE   pSegment,
               int              Remaining,
               PTR_SGL          pSgl)
{
    // Enter a new instance of the recursive routine to build
    // scatter/gather list.
    PTR_SGE_CHAIN    pchain;
    U32              sges;
    int              tmp;
```

-continued

```
// Compute the number of scatter/gather elements available
// for this memory segment.
sges = Size / sizeof (SGE_SIMPLE);
// "tmp" is given the value of the number of simple scatter/gather
// elements this memory segment can contain less one. One element
// is reserved for a chain element in the case that not all simple
// elements can fit into this segment.
if (Remaining-1 < sges-1)
{
    tmp = Remaining -1;
}
else
{
    tmp = sges-1;
}
// Fill in all simple scatter/gather elements for this memory segment
// except for the last one.
while (tmp--)
{
    // Assign all required data values to the simple scatter/gather
    // element structures in this memory segment and increment
    // to the next scatter/gather elements.
    pSegment->Address = pSgl->address;
    pSegment->FlagsLength |= flagsAndLength;
    pSgl++;
    pSegment++;
}
// Check if all elements fit into the current segment
if (sges < Remaining)
{
    // All elements will not fit into the current segment. Update the
    // number of remaining scatter/gather elements that must be
    // added to this SGL and set some necessary flags for the last
    // simple element in this segment.
    Remaining -= sges - 1;
    (pSegment-1)->FlagsLength = lastSegmentFlagsAndLength;
    // At this point in the algorithm, pSegment points to the
    // memory location of where the chain element would be
    // located. Save this value in the variable "pchain",
    pchain = pSegment;
    // Allocate a new memory segment that will contain more
    // simple elements and possibly another chain element.
    // The "pchain" variable points to the chain element that will
    // refer to the new memory segment that has been allocated.
    PSegment = AllocateSegment (&tmp);
    // Make sure the allocation was successful. NOTE: The term
    // "allocation" does not necessarily imply "dynamic memory
    // allocation". It can be any method of getting a segment of
    // memory. If the allocation was a failure, return a negative
    // number otherwise continue. A negative number is
    // interpreted as a failure by the routine.
    If (pSegment = = NULL)
    {
        return -1;
    }
    // Assign all values of the chain element except the "Next
    // Chain Offset" field. Currently, the routine does not know
    // what this value will be.
    pchain->Address = pSegment;
    pchain->Flags = chainFlags;
    pchain->Length = tmp;
    // Make recursive call. The return value of the call is the chain
    // offset of the next memory segment (or zero if there is no
    // chain element or negative for an error) and is assigned to
    // "tmp".
    tmp = buildSgl (Size, pSegment, Remaining, pSgl);
    // Determine if an error occurred while generating any other
    // SGL segments.
    if (tmp >=0)
    {
        // SGL creation has been successful up to this point.
        // Assign the value of "tmp" to the "Next Chain Offset"
        // field.
        pchain->NextChainOffset = tmp;
        // Compute the "Next Chain Offset" value and store
        // in the "tmp" variable. Computation of the "Next
        // Chain Offset" is very simple, no conditional branches
        // and very few mathematical operations.
        tmp (Size - size of(SGE_SIMPLE) )/4;
```

```
        }
    else
    {
        // SGL creation failed, free memory segment allocated
        // for this instance of the recursion. The recursive
        // aspect of the algorithm makes it easy to free this
        // memory if necessary (the variable "pSegment" will
        // point to the memory segment allocated in instance
        // of the routine). Other algorithms may need to
        // traverse the incomplete SGL to determine the
        // addresses of the segments that need to be freed.
        FreeSegment (pSegment);
    }
}
else
{
    // All remaining elements will fit into this segment. Assign
    // appropriate values for the simple element and set "tmp"
    // to zero since there is no chain element.
    pSegment->Address = pSgl->address;
    pSegment->FlagsLength = last_element_flagsAndLength;
    tmp = 0;
}
// The variable "tmp" contains the chain offset (or a negative
// error value) for this memory segment. Return this value to the
// caller.
return tmp;
}
```

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for generating scatter/gather lists comprising the steps of:
   a) providing a list segment for storing scatter/gather entries wherein said list segment has an associated size;
   b) providing a vector of descriptors used to generate scatter/gather entries;
   c) providing a number of remaining entries in said vector of descriptors;
   d) generating a number of scatter/gather entries into said list segment wherein said maximum number is determined in accordance with said size of said list segment;
   e) determining whether additional entries of said number of remaining entries need to be generated;
   f) returning successful completion status to the invoking function in response to a determination that no said additional entries need be generated;
   g) performing steps h) through j) in response to a determination that a number of said additional entries need be generated;
   h) allocating a new list segment having a new associated size;
   i) adjusting said number of remaining entries and said vector of descriptors in accordance with said number of scatter/gather entries generated; and
   j) recursively invoking steps a) through j) using said new list segment and using said new associated size and using said number of remaining entries as adjusted and using said vector of descriptors as adjusted.

2. The method of claim 1 wherein the step h) of allocating includes the steps of:
   h.1) determining that the allocating of said new list segment failed; and
   h.2) returning a failure status to the invoking function in response to the determination that the allocating failed, and
   wherein the step j) of recursively invoking includes the steps of:
   j.1) determining that the recursive invocation returned a failure status;
   j.2) deallocating the previously allocated said new list segment; and
   j.3) returning a failure status to the invoking function in response to the determination that the allocating failed.

3. The method of claim 1 wherein the step h) of allocating includes the step of:
   linking said list segment to said new list segment.

4. A system for generating scatter/gather lists comprising:
   a) means for providing a list segment for storing scatter/gather entries wherein said list segment has an associated size;
   b) means for providing a vector of descriptors used to generate scatter/gather entries;
   c) means for providing a number of remaining entries in said vector of descriptors;
   d) means for generating a number of scatter/gather entries into said list segment wherein said maximum number is determined in accordance with said size of said list segment;
   e) means for determining whether additional entries of said number of remaining entries need to be generated;
   f) means for returning successful completion status to the invoking function in response to a determination that no said additional entries need be generated;
   g) means for invoking operation of means h) through j) in response to a determination that a number of said additional entries need be generated;
   h) means for allocating a new list segment having a new associated size;
   i) means for adjusting said number of remaining entries and said vector of descriptors in accordance with said number of scatter/gather entries generated; and
   j) means for recursively invoking operation of means a) through j) using said new list segment and using said new associated size and using said number of remaining entries as adjusted and using said vector of descriptors as adjusted.

5. The system of claim 4 wherein the means for allocating includes:
   h.1) means for determining that the allocating of said new list segment failed; and
   h.2) means for returning a failure status to the invoking function in response to the determination that the allocating failed, and
   wherein the means for recursively invoking includes:
   j.1) means for determining that the recursive invocation returned a failure status;
   j.2) means for deallocating the previously allocated said new list segment; and
   j.3) means for returning a failure status to the invoking function in response to the determination that the allocating failed.

6. The system of claim 4 wherein the means for allocating includes:
   means for linking said list segment to said new list segment.

7. A method for adding a plurality of scatter/gather entries to a scatter/gather list comprising the steps of:
   a) allocating a list segment for said scatter/gather list wherein the step a) of allocating includes the step of: linking said list segment to a previously allocated list segment;
   b) filling said list segment with a number of said plurality of scatter/gather entries;
   c) determining if additional scatter/gather entries of said plurality of scatter/gather entries remain to be added to said scatter/gather list; and
   d) recursively invoking steps a) through d) until all of said plurality of scatter/gather entries are added to said scatter/gather list.

8. A method for adding a plurality of scatter/gather entries to a scatter/gather list comprising the steps of:
   a) allocating a list segment for said scatter/gather list;
   b) filling said list segment with a number of said plurality of scatter/gather entries;
   c) determining if additional scatter/gather entries of said plurality of scatter/gather entries remain to be added to said scatter/gather list; and
   d) recursively invoking steps a) through d) until all of said plurality of scatter/gather entries are added to said scatter/gather list,
   wherein the step a) of allocating includes the steps of:
      a.1) determining that the allocating of said new list segment failed; and
      a.2) returning a failure status to the invoking function in response to the determination that the allocating failed, and
   wherein the step d) of recursively invoking includes the steps of:
      d.1) determining that the recursive invocation returned a failure status;
      d.2) deallocating the previously allocated said new list segment; and
      d.3) returning a failure status to the invoking function in response to the determination that the allocating/failed.

9. A system for adding a plurality of scatter/gather entries to a scatter/gather list comprising:
   a) means for allocating a list segment for said scatter/gather list, wherein the means for allocating includes: means for linking said list segment to a previously allocated list segment;
   b) means for filling said list segment with a number of said plurality of scatter/gather entries;
   c) means for determining if additional scatter/gather entries of said plurality of scatter/gather entries remain to be added to said scatter/gather list; and
   d) means for recursively invoking means a) through d) until all of said plurality of scatter/rather entries are added to said scatter/gather list.

10. A system for adding a plurality of scatter/gather entries to a scatter/gather list comprising:
   a) means for allocating a list segment for said scatter/gather list;
   b) means for filling said list segment with a number of said plurality of scatter/gather entries;
   c) means for determining if additional scatter/gather entries of said plurality of scatter/gather entries remain to be added to said scatter/gather list; and
   d) means for recursively invoking means a) through d) until all of said plurality of scatter/gather entries are added to said scatter/gather list,
   wherein the means for allocating includes the steps of:
      a.1) means for determining that the allocating of said new list segment failed; and
      a.2) means for returning a failure status to the invoking function in response to the determination that the allocating failed, and
   wherein the means for recursively invoking includes the steps of:
      d.1) means for determining that the recursive invocation returned a failure status;
      d.2) means for deallocating the previously allocated said new list segment; and
      d.3) means for returning a failure status to the invoking function in response to the determination that the allocating failed.

* * * * *